Sept. 6, 1966 R. W. HRADEK 3,271,542
MAXIMUM SAFE SPEED INDICATING SWITCH WITH
CONTACT SHAPED AS THE SPEED CURVE
Filed March 2, 1964
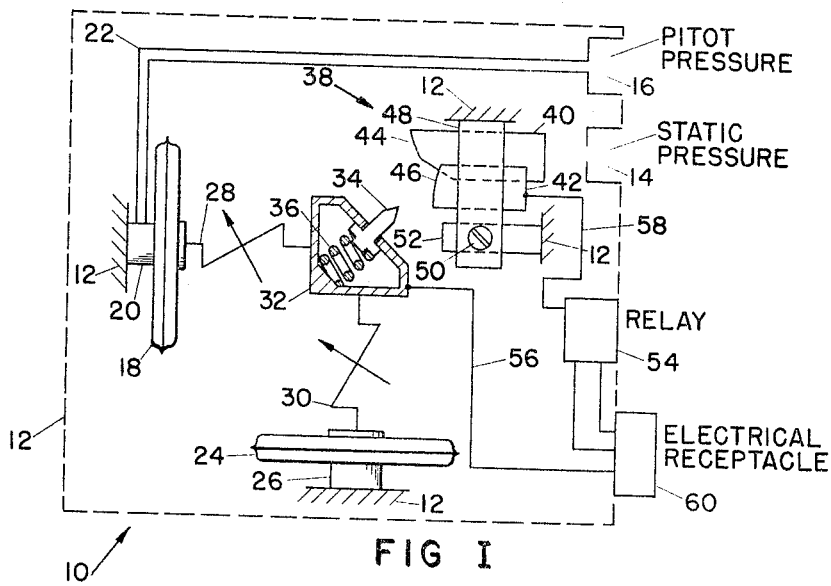
FIG I
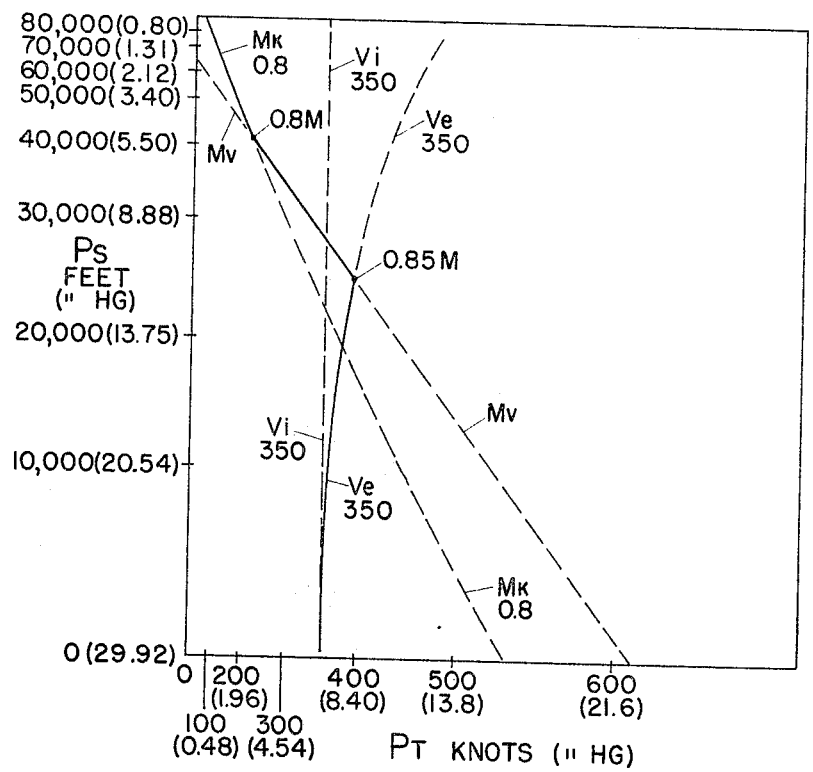
FIG II
INVENTOR.
RICHARD W. HRADEK
BY Roger W. Nolan Jr.
ATTORNEY

United States Patent Office 3,271,542
Patented Sept. 6, 1966

3,271,542
MAXIMUM SAFE SPEED INDICATING SWITCH WITH CONTACT SHAPED AS THE SPEED CURVE
Richard W. Hradek, Davenport, Iowa, assignor to The Bendix Corporation, Davenport, Iowa, a corporation of Delaware
Filed Mar. 2, 1964, Ser. No. 348,402
9 Claims. (Cl. 200—81.5)

The present invention relates to a sensitive speed instrument for aircraft and, more particularly, to an improved warning device which will provide a signal when a predetermined maximum safe speed has been reached by the aircraft.

The present invention is an improvement over the invention described in United States Reissue Patent No. 25,093 reissued December 5, 1961 to Carl E. Johnson et al. and assigned to the assignee of the present invention. Prior to the above invention, instruments for presenting the maximum safe speed or a maximum preset speed of an aircraft were primarily dial indicating instruments in which combinations of pointers and indexes were used. The above invention disclosed an instrument wherein the pilot's visual attention is not required. This invention provides for giving a visual or audible signal which will inform the pilot when the maximum safe speed or maximum preset speed of the aircraft is reached. The maximum safe speed of an aircraft is a speed under which structural fatigue of an aircraft will not occur and maximum preset speed is any speed of the aircraft at which a visual or audible signal is desired.

The present invention has as one of its objects the provision of an improved maximum safe speed or preset speed instrument for aircraft.

There are several speed designations which are used to represent the speed of an aircraft, such as: indicatd airspeed ($Vi$), true airspeed ($Vt$), equivalent airspeed ($Ve$) and Mach number ($M$). Each of these designations of speed can also be used for indicating the maximum safe speed of an aircraft. An instrument utilizing Mach number ($M$) as the maximum safe speed is disclosed in United States Patent No. 2,706,407 issued on April 19, 1955 to Norman F. Hosford and assigned to the assignee of the present invention. An instrument utilizing equivalent airspeed ($Ve$) as the maximum safe speed is disclosed in United States Patent No. 2,807,958 issued on October 1, 1957 to Harry G. Anastasia et al. and assigned to the assignee of the present invention. Improvement over these visual and single maximum speed designating type instruments is found in the above-cited Reissue Patent No. 25,093 wherein the combination of Mach number ($M$) and indicated airspeed ($Vi$) is utilized to provide a signal representing the maximum safe speed or preset speed. Further improvements in the performance of aircraft and the ability to determine more accurately the structural speed limits at which an aircraft can perform necessitate an instrument which can utilize several speed designations for indicating the maximum safe speed of aircraft. These several speed designations, indicated, true and equivalent airspeed and Mach number, may be integrated to give a maximum safe speed schedule for a particular aircraft to give its operational limits.

Another object of the present invention is to provide a sensitive speed warning instrument for aircraft which will provide a signal when the aircraft reaches a predetermined speed of its maximum safe speed or preset speed schedule.

A further object of the present invention is to provide a sensitive speed warning device for aircraft which will transmit an electrical signal when the aircraft reaches a predetermined maximum speed of its speed schedule.

A still further object of the present invention is to provide a single sensitive speed warning device in which means are provided to vary the speed schedule in accordance with predetermined requirements of various types of aircraft.

The foregoing and other objects and advantages of the invention will appear more fully hereinafter from a consideration of the detailed description which follows, taken together with the accompanying drawing wherein an embodiment of the invention is illustrated. It is to be expressly understood, however, that the drawing is for the purpose of illustration and description and is not to be construed as defining the limits of the invention.

In the drawing:

FIGURE I is a schematic diagram of one embodiment of the invention.

FIGURE II is a graph showing the speed schedule for a representative aircraft in terms of the criteria airspeed and altitude.

Referring first to FIGURE II there is shown a graph having total pressure plotted along the abscissa and static pressure plotted along the ordinate. Both the total and static pressures are expressed in inches of mercury ("Hg). For the purpose of illustrating the present invention and its improvement over the existing art there is shown a safe speed schedule (solid line), a predetermined curve of altitude versus indicated airspeed ($Vs$). The curve representing maximum safe values of Mach number and airspeed were selected for the purpose of illustrating a limiting criteria for a representative aircraft, it being expressly understood that the invention is not limited to these particular values or a speed schedule having the particular slopes shown.

The safe speed schedule (solid line) in a combination of three plotted speed values for a representative aircraft. The speed schedule represents the maximum permissible indicated airspeed ($Vs$) at the various altitudes. These values are determined by the structural design of the aircraft. The three plotted curves in FIGURE II which make up the speed schedule (solid line) are: equivalent airspeed ($Ve$) of 350 knots; variable Mach member ($Mv$) of 0.85 M at 25,000 feet altitude of 0.80 M @ 40,000 feet altitude, constant Mach number ($M_k$) of 0.80 M. The solid portion of each of these three curves make up the speed schedule for the aircraft chosen for this illustration. Thus for this aircraft the limiting speed factor for flight up to 25,000 feet altitude is 350 knots equivalent airspeed ($Ve$), from 25,000 to 40,000 feet altitude the limiting factor is a variable Mach number ($Mv$), from 0.85 to 0.80 M which is represented in the graph by a straight line having a particular slope and above 40,000 feet altitude the limiting factor is a constant mach number ($M_k$) of 0.80 M. Therefore, in terms of indicated airspeed ($Vi$), the limit increase at a variable rate to 25,000 feet altitude in accordance with equivalent airspeed ($Ve$), decrease at constant rate to 40,000 feet altitude in accordance with a variable Mach number ($Mv$) and decreases at a variable rate above 40,000 feet altitude in accordance with a constant Mach number ($M_k$).

Advantageously, apparatus designed to provide a signal when any speed value of the safe speed schedule of FIGURE I has been reached by the aircraft is shown in FIGURE I. As will hereinafter be apparent from the description of the embodiment shown, any speed schedule for an air vehicle may be utilized with the inventive structure of FIGURE I.

In FIGURE I there is shown a speed sensing device 10 designed for use as a warning device when an aircraft has reached a predetermined maximum safe speed or a preset speed. The speed device 10 has a sealed housing 12 having two inlet ports 14 and 16. Static pressure inlet port 14 permits the pressure inside the sealed housing 12 to be equal that of the ambient air outside the aircraft. Total or pitot pressure inlet port 16 permits the connecting of a pressure responsive device inside the sealed housing to a total or pitot pressure line of the aircraft.

A first fluid pressure responsive element such as capsule 18 (airspeed diaphragm) has one side rigidly mounted relative to the sealed housing 12 by means of diaphragm support 20. The airspeed diaphragm 18 is joined at pitot pressure inlet port 16 through fluid line 22 and diaphragm support 20. The second side of airspeed diaphragm 18 is free for movement responsive to the changes in the difference in total pressure and static pressure.

A second fluid pressure responsive element such as capsule 24 (aneroid diaphragm) is an evacuated sealed capsule, one side of the aneroid diaphragm 24 is securely mounted to the housing 12 through an aneroid support 26. The second side of the aneroid diaphragm 24 is free to move responsive to changes in the static pressure.

The fluid pressure responsive capsules 18 and 24 may take a variety of forms, such as a diaphragm or bellows.

Advantageously, the movable or free side of airspeed diaphragm 18 and aneroid diaphragm 24 are connected to adjustable means of any well known form such as linkages 28 and 30. Movable contact 32 is disposed for connection to linkages 28 and 30. Contact pin 34 is disposed through an opening in contact 32 and is maintained in a biased position by means of overload spring 36. Fixed contact 38 is mounted to the housing 12 and is positioned in the path of movable contact 32.

Advantageously fixed contact 38 may include two electrical contact elements 40 and 42 having electrical contact surfaces 44 and 46 as shown. Elements 40 and 42 are held in a fixed position against a portion of the housing 12 (not shown) by means of a flexible arm 48 which is joined to the housing 12 and held in a fixed position by means of screw 50 anchoring into plate 52 of the housing 12. The position of the elements 40 and 42 as described above are adjustable, and the position of their electrical contact surfaces 44 and 46 relative to the movable contact 32 determines the predetermined or safe speed schedule of the warning instrument. Thus the schedule for the instrument may be changed by positioning the elements 40 and 42 or by replacing the elements 40 and 42 with elements having different electrical contact surfaces. It is to be expressly understood that within the purview of the invention, elements 40 and 42 may be replaced with a single element or replaced with an element set of more than two.

Upon engagement of the movable contact 32 with the fixed contact 38 an electrical circuit is completed which results in the energization of relay 54. The electrical circuit comprises wire 56, contact 32, contact 38, and wire 58. Relay 54 is associated with a suitable electrical receptacle 60 which may be connected to a suitable warning device (not shown).

In operation, the device as illustrated in FIGURE I and preset for an aircraft with the limits of FIGURE II will operate as follows. Movable contact 32 and fixed contact 38 are set apart as shown before flight of the aircraft. When the aircraft flies at an altitude and indicated airspeed (Vi), within the area (shown in FIGURE II) to the left of the speed schedule curve (solid line), the contacts will not engage. Any flight of the aircraft at an altitude and indicated airspeed (Vi) in the area to the right of the speed schedule curve (solid line), the contacts 32 and 38 will engage resulting in completion of the electrical circuit and energization of the relay 54. Thus the pilot is warned that the predetermined maximum speed or maximum safe speed of the aircraft has been reached.

While the indicating device as shown in FIGURE I is of the construction shown and described, it is understood that the instant invention is not limited to any particular form or division. Moreover, other changes and modifications of the novel device contemplated herein may be made by those skilled in the art without departing from the scope of the instant invention.

I claim:
1. An instrument for activation at a predetermined maximum speed of its speed schedule comprising an instrument housing, static pressure responsive means mounted within said housing for producing movement with pressure variations incident to changes in ambient pressure, differential pressure responsive means mounted within said housing for producing movement with pressure variations incident to changes in total pressure and static pressure, a movable contact, first and second mechanical linkage couplings connecting said movable contact with said static pressure responsive means and said differential pressure responsive means respectively, a second contact disposed in the path of said movable contact for engagement therewith when a predetermined maximum speed of said speed schedule is reached, said second contact comprising electrical contact means having its electrical contact surface defining said speed schedule.

2. The invention defined in claim 1 including means for adjusting the position of said electrical contact means relative to said movable contact for varying said speed schedule.

3. The invention defined in claim 2 including adjustable means in said first and second mechanical linkage couplings for adjusting the position of said movable contact to vary the degree of separation from said second contact independently of said ambient pressure and total pressure whereby said speed schedule is varied.

4. A switch for activation at a predetermined maximum speed of its speed schedule comprising an instrument housing, a static pressure responsive capsule mounted within said housing and movable with pressure variations incident to changes in ambient pressure, a differential pressure responsive capsule mounted within said housing and movable with pressure variations incident to changes in total pressure and static pressure, a movable contact, first and second mechanical linkage couplings connecting said movable contact with said static pressure responsive capsule and said differential pressure responsive capsule respectively, a fixed contact disposed in the path of said movable contact for engagement therewith when a predetermined maximum speed of said speed schedule is reached, said fixed contact comprising electrical contact means having its electrical contact surface defining said speed schedule, and means for adjusting the position of said electrical contact means relative to said movable contact for varying said speed schedule.

5. The invention defined in claim 4 wherein said electrical contact means comprises not less than two electrical contact elements having the combination of their electrical contact surfaces defining said speed schedule.

6. An electrical switch for activation at a predetermined maximum safe speed of its safe speed schedule comprising an instrument housing, a static pressure responsive capsule mounted within said housing and movable with pressure variations incident to changes in ambient pressure, a differential pressure responsive capsule mounted within said housing and movable with pressure variations incident to changes in total pressure and static pressure, a movable electrical contact, first and second mechanical linkage couplings connecting said movable contact with said static pressure responsive capsule and said differential pressure responsive capsule respectively, a fixed electrical contact disposed in the path of said movable contact, said movable contact movable toward and away from said fixed contact, for electrical engagement therewith when a predetermined maximum safe speed of said speed schedule is reached, said fixed contact comprising electrical contact means having its electrical contact surface defining said speed schedule, and means for adjusting the position of said electrical contact means relative to said movable contact for varying said speed schedule.

7. The invention defined in claim 6 wherein said electrical contact means comprises not less than two electrical contact elements having the combination of their electrical contact surfaces defining said speed schedule.

8. The invention defined in claim 7 including adjustable means in said first and second mechanical linkage couplings for adjusting the position of said movable contact to vary the degree of separation from said second contact independently of said ambient pressure and said total pressure whereby said speed schedule is varied.

9. The invention defined in claim 8 including means for absorbing the overload on said contacts.

References Cited by the Examiner
UNITED STATES PATENTS

| | | | |
|---|---|---|---|
| 2,128,169 | 8/1938 | Shanley | 340—27 |
| 2,814,688 | 11/1957 | Kutzler | 200—83 |
| 2,972,028 | 2/1961 | Johanson et al. | 200—81.4 |

BERNARD A. GILHEANY, *Primary Examiner.*

H. M. FLECK, *Assistant Examiner.*